United States Patent [19]

Yocum

[11] Patent Number: 4,593,947
[45] Date of Patent: Jun. 10, 1986

[54] VACUUM LIFTING DEVICE

[76] Inventor: Roderick E. Yocum, 11615 Detwiler Rd., Columbiana, Ohio 44408

[21] Appl. No.: 645,679

[22] Filed: Aug. 30, 1984

[51] Int. Cl.$^4$ ............................................. B66C 1/02
[52] U.S. Cl. .................................................. 294/64.1
[58] Field of Search ............... 294/64.1, 64.2, 64.3, 294/1.1, 19.1, 25, 21; 248/206.2, 206.3, 206.4, 362, 309.3

[56] References Cited

U.S. PATENT DOCUMENTS

| | | | |
|---|---|---|---|
| 1,400,573 | 12/1921 | Stader | 294/64.1 |
| 2,209,424 | 7/1940 | Shipman et al. | 294/64.1 |
| 2,303,393 | 12/1942 | Schmidt | 294/64.1 |
| 2,607,620 | 8/1952 | Oliveri | 294/64.1 |
| 3,262,585 | 7/1966 | Olson | 294/64.1 |

Primary Examiner—James B. Marbert
Attorney, Agent, or Firm—Harpman & Harpman

[57] ABSTRACT

A vacuum lifting device utilizing a selectively releaseable suction cup with a handle engagable on smooth surfaced articles to be moved. The vacuum lifting device is disengaged from the article by selectively venting the suction cup to atmosphere.

4 Claims, 2 Drawing Figures

VACUUM LIFTING DEVICE

BACKGROUND OF THE INVENTION

1. Technical Field

This invention relates to hand held vacuum cups that are used to grip and move a smooth surfaced article, such as floor tiles or glass. The vacuum cups are manually vented to release the vacuum formed by depressing the same on the article to be moved.

2. Description of the Prior Art

Prior art devices of this type have relied on a number of different releasable vacuum cup designs. See for example U.S. Pat. Nos. 2,303,393, 2,209,424, 2,607,620 and 1,400,573.

In U.S. Pat. No. 2,303,393, a vacuum lifting device is disclosed wherein a resilient suction cup is attached to a handle with a spring urged valve to vent the same to atmosphere.

U.S. Pat. No. 2,209,424 shows a lifting implement having a suction cup on a handle portion. The suction cup is vented by a pivoted lever wherein the suction created maintains the seal between the lever and the cup.

U.S. Pat. No. 1,400,573 has a suction cup secured to a handle portion again with a pivoted lever forming a valve seat maintaining the vacuum as seen in U.S. Pat. No. 2,209,424.

In U.S. Pat. No. 2,607,620, a gripping tool is disclosed wherein an elongated resilient sleeve is mounted within a handle having a spring urged valve venting the sleeve via a check ball valve within the sleeve.

Applicant's device utilizes a suction cup with a simple fail-safe spring urged valve within a multiple sleeve and release button configuration.

SUMMARY OF THE INVENTION

A vacuum lifting device for gripping and moving smooth surfaced objects having a selective vented suction cup mounted on a handle wherein a spring urged valve maintains the vacuum integrally formed by depressing the suction cup on a smooth surfaced object.

DESCRIPTION OF THE PREFERRED EMBODIMENT

Figure 1:
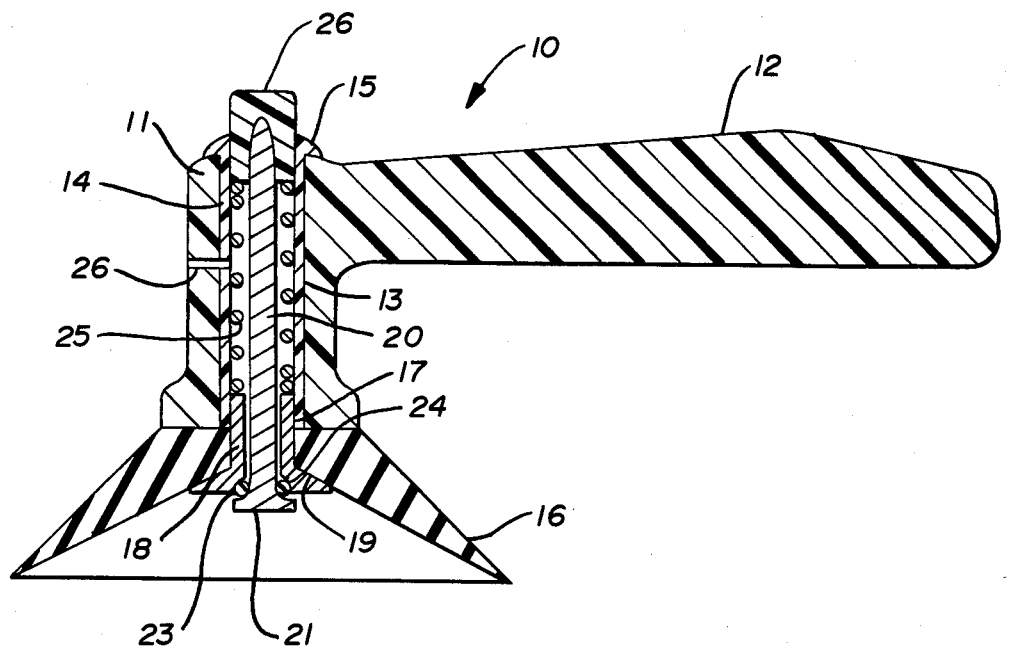
FIG. 1 is a cross sectional view of the vacuum lifting device in closed position.

A vacuum lifting device 10 comprising a main body member 11 with an integral handle portion 12 extending at right angles therefrom with a longitudinally extending bore 13 centrally disposed within said main body member 11 as seen in FIG. 1 of the drawings. A sleeve 14 having a tapered annular flange 15 is positioned within the bore 13 with the tapered flange 15 engaging the upper surface of the main body member 11. A relatively large resilient suction cup 16 is apertured at 17 and secured to the bottom of the main body member 11 by a flanged retainer sleeve 18 secured within the lower end of the sleeve 14. The retainer sleeve 18 passes through the aperture within the suction cup 16 and engages the same along a tapered annular flange 19 defining the free end of the retainer sleeve 18.

An adhesive is applied between the outside of the retainer sleeve 18 and the inner surface of the sleeve 14 where they meet effectively securing the sleeves together and retaining the suction cup 16 between the retainer sleeve 18 and the lower portion of the main body member 11.

A valve stem 20 has a gasket retainer flange 21 at one end and a rounded tapered portion 22 on the other end thereof. An O-ring 23 is positioned on the valve stem 20 around the gasket retainer flange 21 so as to engage a chamfer 24 in the retainer sleeve 18 forming a seal therebetween. The valve stem 20 is positioned within and extends through the sleeves 14 and 18 with a spring 25 around the valve stem 20 caged between the retainer sleeve 18 and a valve release button 26 that is permanently secured to the free end of said valve stem 20 once within the sleeve 14.

A vent passageway 26 is formed in the main body member 11 and sleeve 14 in communication with the area defined within the sleeve 18 providing a vent to atmosphere.

It will be apparent from the foregoing description that the aperture within the resilient suction cup 16 is efficiently sealed to the atmosphere by the valve configuration hereinbefore described and that upon compression of the suction cup 16 via the handle portion 12 when against a smooth relatively stiff surface, that the air within the area defined by the suction cup 16 and the surface will be expelled creating a partial vacuum within securely holding the suction cup 16 in place on the surface.

Figure 2:
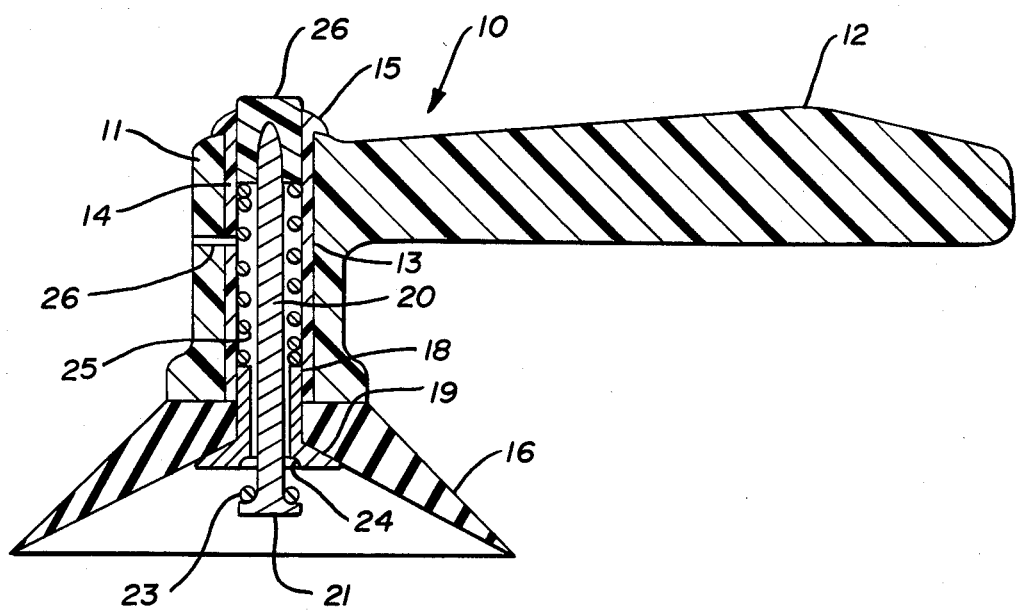
FIG. 2 is a cross sectional view of the vacuum lifting device in open vented position.

Referring to FIG. 2 of the drawings, to release the suction cup from the surface the valve release button 26 is depressed against the spring 25 so that the valve stem 20 moves downwardly moving the O-ring from its sealing relation against the chamfer 24 venting to atmosphere the air with the suction cup 16 and releasing the same from its engagement with the smooth surface, not shown.

It will thus be seen that a new and novel suction cup lifting device has been illustrated and described and it will be apparent to those skilled in the art that various changes and modifications may be made therein without departing from the spirit of the invention and having thus described my invention, what I claim is:

1. An improvement for a vacuum lifting device comprising a main body member with a handle attached thereto, a deformable elastomeric apertured suction cup on said body member, the improvement comprising a sleeve within said body member, means for securing said sleeve therein, a retainer sleeve having a tapered annular flange extending outwardly from said apertured suction cup and engaging the same, said retainer sleeve engaged partly within said sleeve, a valve stem within said sleeve having a gasket retainer flange on said valve stem and an O-ring on said gasket retainer flange in sealing relation with said retainer sleeve, resilient valve stem engagement means, and means to vent said suction cup via said sealing means.

2. The improvement for a vacuum lifting device of claim 1 wherein said means for securing said sleeve within said body member comprising a tapered annular flange on one end of said sleeve engagable on said body member.

3. The improvement for a vacuum lifting device of claim 1 wherein said resilient valve stem engagement means comprising a spring registrable on a valve release button on one end of said valve stem and on said retainer sleeve.

4. The improvement for a vacuum lifting device of claim 1 wherein said means to vent said suction cup via said sealing means comprises a vent passageway in said body member and said sleeve in communication with said suction cup.

* * * * *